No. 689,408. Patented Dec. 24, 1901.
A. N. PETIT.
METHOD OF MAKING SOUND RECORD CYLINDERS.
(Application filed Dec. 8, 1900.)
(No Model.)
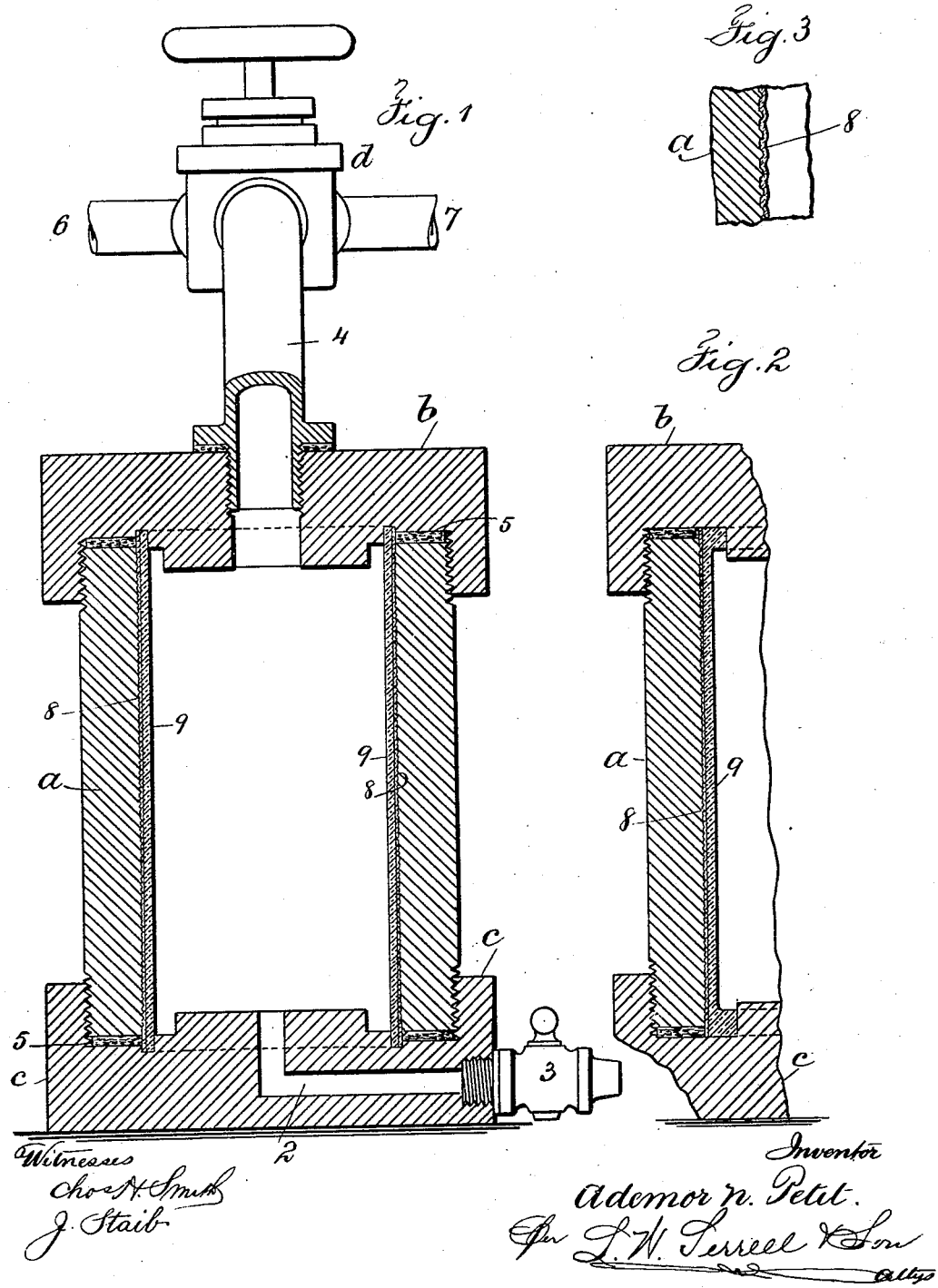

UNITED STATES PATENT OFFICE.

ADEMOR N. PETIT, OF NEWARK, NEW JERSEY, ASSIGNOR TO HIMSELF AND ALBERT O. PETIT, OF NEWARK, NEW JERSEY.

METHOD OF MAKING SOUND-RECORD CYLINDERS.

SPECIFICATION forming part of Letters Patent No. 689,408, dated December 24, 1901.

Application filed December 8, 1900. Serial No. 39,127. (No specimens.)

*To all whom it may concern:*

Be it known that I, ADEMOR N. PETIT, a citizen of the United States, residing at Newark, in the county of Essex and State of New Jersey, have invented an Improvement in the Method of Making Duplicate Sound-Record Cylinders, of which the following is a specification.

Heretofore matrices have been made of original sound-records, and duplicates have been prepared from such matrices; and my present invention relates to the method of making duplicate sound-record cylinders from matrices of an original record, and the same is an improvement upon the method set forth in my application, Serial No. 25,386, filed July 31, 1900.

In carrying out my present invention I apply to the matrix-surface a material in a fluid state, preferably by a brush and centrifugal motion, and which material as the same dries and sets forms a skin or film upon the surface of the matrix, which film takes the impression of the matrix in its surface and serves for the surface of the duplicate sound-record cylinder. As a material for coating the surface of the matrix and forming the film I prefer to employ celluloid, gelatin, lac, glue, gum, collodion, or similar material, and this may be applied to any desired thickness in a fluid state. I employ a foundation or cylindrical shell fitting closely within the said film, and this foundation or shell is in whole or part of material adapted to be softened and connected by heat and pressure through adhesion to the duplicate sound-record film. I prefer that the material of the foundation or shell should be impregnated with or have a surface of the same material as that composing the film, so that connection between the two by heat and pressure may be in the form of a cementing action.

I prefer to employ an apparatus into which steam may be introduced under considerable pressure for the purpose of heating and softening the foundation or cylindrical shell and at the same time expanding the same sufficiently so as to form an intimate contact and adhesion with the film, and I propose as soon as sufficient time has elapsed to insure a connection of the foundation and film in this manner to replace the steam under pressure by air under pressure and to chill the matrix, so as to cool and set the parts and thereafter to maintain the pressure of air for a sufficient time until the connected film and foundation are thoroughly set and cooled, after which the same is to be removed from the matrix.

In the drawings, Figure 1 is a vertical section of a device adapted for the carrying out of my improved method. Fig. 2 is a partial vertical section representing a modification, and Fig. 3 is a detached vertical section showing part of a connected matrix and film upon a larger scale.

The improved apparatus for carrying out the method and making the article is preferably composed of a matrix $a$, a head $b$, connected by a threaded flange to one end of the said matrix, a base $c$, connected also by a threaded flange to the other end of the said matrix in a similar manner, there being packings 5, preferably, between the ends of the matrix and the head and base, so as to insure a tight joint. The base $c$ is preferably provided with an exit-opening 2 and an escape-cock 3, and the head is preferably provided with a pipe 4, and a three-way cock $d$ connected to the pipe 4, and from the opposite side of which there is a steam-pipe 6 and a pipe 7 for compressed air.

8 represents the film duplicate sound-record, and 9 the foundation or cylindrical shell. I prefer to employ within the head and base annular grooves to receive the foundation ends, with the object of insuring the steam and air pressure doing the work and preventing the same getting in between the foundation and skin.

With the matrix separated and disconnected in relation to the head and base, and which matrix is formed in any manner well known in the art, the inner surface of the matrix is to be coated to any desired thickness by a material in a fluid state. This material may be applied by a brush or centrifugal motion, or both, so as to impart to the matrix-surface an even homogeneous film until the desired thickness is obtained, when the same is allowed to set or dry to yield an impression of the matrix. The film thus obtained is firm, dense, and yet flexible, and is preferably composed of such materials as have hereinbefore been referred to.

The foundation 9 or cylindrical shell is adapted to fit closely within the film 8, and this foundation may be made with integral inturned ends or not, as this forms no necessary part of the invention. I have, however, shown in Fig. 1 a foundation without inturned ends, and in Fig. 2 a foundation with inturned ends as the method of the present invention is equally applicable to both forms of foundation. This foundation is preferably made of material adapted to be softened and connected by heat and pressure through adhesion to the duplicate sound-record film, and the material of the foundation is preferably of such a nature as to carry a substance of a similar nature to that composing the film either by being impregnated with or by having an applied surface coating of such material, so that the connection formed between the two by heat and pressure may be a cementing action. The material of the foundation may be and preferably is the same as that of the film, but loaded with pigment to give body and cheapness.

After the film 8 has been made and the foundation 9 inserted within the matrix the head $b$ and the base $c$ are connected to the matrix, as shown, and the escape-cock 3 closed. Steam is then admitted by the pipe 6 and the three-way cock $d$ and pipe 4 into the cavity or space within the matrix and within the said foundation. The heat softens the foundation or cylindrical shell and the pressure expands the same. The heat also softens the film so that the surface of the film and the surface of the expanding foundation come into intimate contact and connection and a cementing action is produced between the two, because of the substances of similar nature, by the heat and pressure, so that they are connected by adhesion. After sufficient time has elapsed for this operation I prefer to close off the steam and to replace the same by air under pressure and thereafter to submerge the matrix into a bath of cold water, which suddenly chills the matrix, the film, and the foundation, while the pressure is maintained within the same. I thereafter remove the matrix from the water or cooling mixture. In substituting the air under pressure for the steam under pressure I turn the three-way cock and admit compressed air and open the escape-cock to blow out the steam. After the steam has been blown out the escape-cock 3 is closed and the air-pressure maintained within the matrix until the parts are so thoroughly cooled and set that it is perfectly safe to close off the compressed air, separate the parts, and take out the duplicate sound-record cylinder complete.

If the film 8 is composed of celluloid, the foundation 9 should either be impregnated with a solvent of celluloid or should have an applied surface of celluloid or a solvent adhering thereto, so that the same, when softened with the film and forced by pressure into connection with the materials, will join and form a homogeneous connected or cemented mass, and in any event, whatever material the film may be composed of, the backing or foundation should carry a substance of a similar nature by being either impregnated with the same or having an applied surface coating of such material, which under heat and pressure will combine or commingle with the material of the skin so as to form a homogeneous or permanently-connected mass.

I claim as my invention—

1. The method herein specified of making duplicate sound-record cylinders, consisting in forming upon the surface of a matrix a film of material applied thereto, inserting within the matrix and film a foundation or cylindrical shell closely fitting the same and which shell carries a substance of a similar nature to that composing the film applying heat and pressure within the foundation and matrix to soften the material of the foundation or cylindrical shell and that of the film and to force the same into intimate contact and adhesion, and maintaining the pressure until the parts set and cool, substantially as set forth.

2. The method herein specified of making duplicate sound-record cylinders, consisting in forming upon the surface of a matrix a film of material applied thereto, inserting within the matrix and film a foundation or cylindrical shell closely fitting the same and which shell carries a substance of a similar nature to that composing the film, applying heat and pressure within the foundation and matrix to soften the material of the foundation or cylindrical shell and that of the film and to force the same into intimate contact and adhesion, and chilling the matrix and the connected film and foundation to set and cool the parts and maintaining the pressure during the chilling and until the operations are fully completed, substantially as set forth.

3. The method herein specified of making duplicate sound-record cylinders, consisting in forming upon the surface of a matrix a film of material applied thereto, inserting within the matrix and film a foundation or cylindrical shell closely fitting the same and which shell carries a substance of a similar nature to that composing the film, applying pressure and heat within the foundation and matrix to soften the material of the foundation or cylindrical shell and that of the film and to force the same into intimate contact and adhesion, displacing the material producing the heat and pressure by air or similar fluid under pressure and chilling the matrix by immersing the same in a cooling material which at the same time chills the connected film and foundation, removing the same from the chilling mixture, and maintaining the pressure thereafter until the parts are thoroughly set and the finished sound-record ready for removal, substantially as set forth.

4. The method herein specified of making duplicate sound-record cylinders consisting in forming upon the surface of a matrix a film of material applied thereto, placing within the film a permanent base or backing, applying heat and pressure to soften the parts and force them into intimate contact and adhesion, substantially as specified.

5. The method herein specified of making duplicate sound-record cylinders consisting in uniting a permanent base or backing to a film-surface and impressing a record-matrix into said film-surface by the same pressure, substantially as specified.

6. The method herein specified of making duplicate sound-record cylinders consisting in bringing a prepared film-surface into opposition to a contained and substantially contacting permanent base or backing, applying heat to soften the parts and a pressure that is maintained as desired to unite the parts and insure the impressing of the film-surface by a record-matrix, substantially as specified.

Signed by me this 3d day of December, 1900.

ADEMOR N. PETIT.

Witnesses:
GEO. T. PINCKNEY,
S. T. HAVILAND.